(12) United States Patent
Roschin et al.

(10) Patent No.: US 8,969,517 B2
(45) Date of Patent: Mar. 3, 2015

(54) METHOD FOR PROCESSING VEGETABLE RAW MATERIALS

(76) Inventors: Viktor Ivanovich Roschin, St. Petersburg (RU); Vagif Sultanovich Sultanov, St. Petersburg (RU)

( * ) Notice: Subject to any disclaimer, the term of this patent is extended or adjusted under 35 U.S.C. 154(b) by 1466 days.

(21) Appl. No.: 10/559,114

(22) PCT Filed: Apr. 27, 2004

(86) PCT No.: PCT/RU2004/000162
§ 371 (c)(1),
(2), (4) Date: Dec. 2, 2005

(87) PCT Pub. No.: WO2004/108848
PCT Pub. Date: Dec. 16, 2004

(65) Prior Publication Data
US 2006/0198910 A1    Sep. 7, 2006

(30) Foreign Application Priority Data

Jun. 6, 2003 (RU) ................................ 2003117227

(51) Int. Cl.
| | | |
|---|---|---|
| A61K 6/08 | (2006.01) |
| A61K 8/37 | (2006.01) |
| A61K 47/14 | (2006.01) |
| A61K 8/92 | (2006.01) |
| A61K 6/097 | (2006.01) |

(52) U.S. Cl.
USPC ........... 530/344; 530/207; 530/208; 530/401; 424/774

(58) Field of Classification Search
None
See application file for complete search history.

(56) References Cited

U.S. PATENT DOCUMENTS

| 4,564,477 A | * | 1/1986 | Takigawa et al. | ............... | 554/35 |
| 4,565,477 A | * | 1/1986 | Axelrod | ........................ | 412/5 |

FOREIGN PATENT DOCUMENTS

| RU | 2 015 150 | 6/1994 |
| RU | 2 017 782 | 8/1994 |
| RU | 2 156 785 | 9/2000 |
| RU | 2 183 630 | 6/2002 |
| SU | 1689395 | 11/1991 |

OTHER PUBLICATIONS

Conner et al., Neutrals in Southern Pine Tall Oil, 1975, J. American Oil Chemists' Society, 52, 334-338.*
Shi et al., Isolation and Structural Determination of a Novel Bicyclic Taxane Diterpene from Needles of the Chinese Yew, *Taxus mairei*, 1999, Biosci. Biotech. Biochem., 63, 756-759.*
Wager-Page et al., The Role of Sensory Cues and Fedding Context in the Mediation of Pine-Needle Oil's Repellency in Prairie Voles, 1995, National Wildlife Research Center Repellents Conference 1995, USDA National Wildlife Research Center Symposia, 25, 301-302.*
Christie WW, Advance in Lipid Methodology, vol. 2, pp. 69-111, 1993.*

* cited by examiner

*Primary Examiner* — Terry McKelvey
*Assistant Examiner* — Catheryne Chen
(74) *Attorney, Agent, or Firm* — Foley & Lardner LLP

(57) ABSTRACT

The inventive method for processing vegetable raw materials consisting in organic solvent-extracting said materials, isolating it by retention which is associated with cooling and wax filtration, separating free oxides from the thus obtained solution of extractive substances by alkali solution action, dividing the obtained neutralized solution into a neutral substance solution in the hydrocarbon solvent and a water-alkali solution of organic acid salts, acidifying said salt solution, isolating chlorophilline acids and a fatty and resin acid fraction therefrom by retention, dividing the sum of diterpenic and higher fatty acids, distilling the solvent from neutral substances and in dividing said neutral substances. The diterpenic and higher fatty acid sum is treated in a low-molecular alcohol by adding a sulphuric acid in the form of a catalyst. Said method also consists in distilling alcohol and neutralizing the diterpenic acids and catalyst, extracting the higher fatty acid ethers, acidifying the water-alkali solution and extracting isolated diterpenic acids, distilling said solvent and in producing a rodent repellent. The neutral substances are subsequently extracted into acetone and $C_1$-$C_3$ alcohol. Afterwards, during acetone treatment, the concentrates of higher fatty acid esters are produced in association with triterpenic alcohols, stearins, higher fatty alcohols and an acetone-soluble residue. During the residue treatment by alcohol, the sum of diterpenic acids is separated, and the saponification of said acids makes it possible to produce a polyprenol concentrate for separating polyprenols therefrom by chromatography.

13 Claims, No Drawings

METHOD FOR PROCESSING VEGETABLE RAW MATERIALS

TECHNOLOGICAL AREA OF INVENTION

The invention pertains to the field of forest-chemistry industry, and specifically, to methods of comprehensive processing of plant raw materials to obtain a range of valuable products for utilization in pharmaceutical and cosmetics industry, agriculture, and common chemical products.

Plant raw materials include green needles of the following conifer species: common pine (*Pines silvestris*), Siberian pine (*Pinus sibirica*), common and European spruce (*Picea obovata, Picea abies* (L) Karst), Siberian fir (*Abies sibirica*), China fir (*Cunninghamia lanzeolata*) and tree foliage of deciduous species: *Gingko biloba*.

Level of Technological Invention

Currently, there are certain known methods for processing green needles of conifer species, which result in obtaining products with a wide spectrum of utilization.

There is a known method of processing fir needles (RU No. 2183630, C07 D 309/40, C 09 F 1/00, 2000). This method includes extraction of fir green needles, settling of extract, separation of crystalline fraction from the green needles extract with subsequent processing of the latter into feed flour. This method differs in that the settling of the extract is performed at 0-24° C. for 16-24 hours; after separation, the crystalline part is rinsed with low-polar organic solvent with a ratio of substance:solvent being at least 1:4; then, the low-polar solvent is removed from the crystalline fraction and maltol crystals are isolated using sublimation at 95-105° C. at decreased atmospheric pressure. Extraction of fir green needles is performed using liquid $CO_2$. The obtained maltol is 98-99.9% pure. This method allows for obtaining not only maltol, but also carbon dioxide extract, feed flour or compost green needles from green fir needles.

A known method for deep processing of green conifer needles (RU No. 2015150, C09 F 1/00, C 11 B 1/10, 1991) includes extraction of green needles using organic solvent; separation of coniferous wax by settling and filtration while cooling; saponification of obtained solution of extractive compounds with a hydrocarbon solvent using an alkaline solution; separation of saponified solution into a fraction containing a solution of neutral compounds in a hydrocarbon solvent and a fraction containing water-alkaline solution of salts of organic acids, which is then fractionalized by settling into chlorophyllin acids and a mixture of fatty and resin acids. The latter is used for obtaining insecticide. Neutral compounds undergo vacuum distillation resulting in obtaining of isoabienol.

A known method for processing extractive compounds of green conifer needles (RU No. 2156785, C09 F 1/00, 1999) includes isolation of wax; vacuum distillation of obtained solution with separation into sesquiterpenoids, labdanic diterpeniods and distillation remainder fractions; saponification of the distillation remainder using an alcohol-alkaline solution; treatment of saponification products with organic solvent and water; separation of non-saponifiable compounds by settling with subsequent isolation of sterins, polyprenols, di- and triterpenoids using extraction with a liquid solvent. A distinctive feature of this method is that vacuum distillation is performed under conditions of turbulent film flow of the solution over a heated surface with separation of sesquiterpenoids and labdanic diterpenoids fractions within a given temperature range of the distilled liquid, with addition of solution obtained at the stage of additional re-crystallization of isolated wax at the vacuum distillation stage. Saponification of distillation remainder is performed at 65-70° C. The additional wax re-crystallization is performed by dissolving wax in an organic solvent with subsequent cooling of the solution at certain temperature, separation of formed solid fraction by filtration and removing of solvent from the filtrate.

All known methods have a shortcoming in that they are able to isolate and utilize only a part of the extractive compounds that can be dissolved in low-polar extracting agents (petroleum, petroleum ether) or in water-natural conifer extract). The other extractive compounds, which are non-soluble in water or low-polar solvents, remain behind in the green needles after extraction.

The method most similar in technology and results is a method for processing green conifer needles (RU No. 2017782, C09 F 1/00, C 11 B 1/10, 1991). This method includes extraction of green needles by treating it with an extracting agent (organic solvent); isolation, settling and filtration of coniferous wax with m.p. of 72-760° C.; saponification of obtained solution of extractive compounds in a hydrocarbon solvent using a 20-40% alkali aqueous solution; separation of the saponified solution into a solution of neutral compounds in hydrocarbon solvent and water-alkaline solution of salts of organic acids; acidification of obtained water-alkaline solution of salts by inorganic or organic acid to pH 1-3 and isolation of chlorophyllin and total higher fatty and resin acids (with subsequent production of plant protection agents, and rodent repellents); removal of solvent from solution of neutral compounds and subsequent fractioning via settling of waxes with m.p. of 52-56° C. and vacuum distillation with residual pressure of no more than 1300 Pa into 3 fractions with b.ps. of 90-120° C., 120-210° C. and distillation remainder. The distillation remainder is treated with alcohol alkali solution, then alcohol is removed; the remainder is dissolved in organic solvent, and then water is added. The solution is separated by settling into a solution of fatty acids and a solution of unsaponifiable compounds with subsequent isolation of fatty acids from salts by acidification of fatty acids concentrate to pH 1-3. Unsaponifiable compounds are used for isolation of sterins, polyprenols, di- and triterpenoids by a liquid solvent extraction method.

This method has some shortcoming such as: vacuum distillation of neutral compounds at high temperature (up to 240° C.) does not allow for conservation of all polyprenols as they partially (10-15% of total content) dehydrate to carbohydrates; isolation of labdanic fraction during distillation of neutral compounds separated from waxes leads to partial isomerization of the labdanoids, their polymerization and correspondingly to reduced yields. Isomerization and polymerization of some labdanoids results in formation of artificial compounds. Other disadvantages of this method include its multi-stage character and generation of products, which can not be utilized due to their artificial nature (polymer fractions).

The arguments outlined above are confirmed by results obtained from processing of green conifer needles. They are known to specialists in the field of processing plant raw materials and allow for stating, that up to present time, no effective processes for obtaining extractive compounds from coniferous or deciduous tree foliage with maximized yields of major products have been developed.

DESCRIPTION OF THE INVENTION

Technical outcomes of the invention are:
increased process effectiveness in processing extractive compounds from green conifer needles and foliage of deciduous species;

increased yields of main products: concentrate of labdanoids, fats and higher fatty acids; concentrate of polyprenols; increased yield of chlorophyllin acids and rodent repellent. This outcome has been achieved as follows:

The invention is based on a method of processing plant raw materials from green conifer needles and foliage of deciduous species, which includes the following: extraction using organic solvent; subsequent isolation by settling with cooling and filtering of waxes; separation of free acids from the obtained solution of extractive compounds in hydrocarbon solvent with alkali solution; fractionalization of the obtained neutralized solution into a solution of neutral compounds in hydrocarbon solvent and a water-alkaline solution of salts of organic adds; acidification of water-alkaline solution of salts by organic and inorganic acid and subsequent separation by settling into chlorophyllin acids, and the fatty and resin acids fraction, with subsequent fractioning of the total diterpene and higher fatty acids; distillation of solvent from the neutral compounds and separation of the neutral compounds.

This method differs from others in that: the combined diterpene and higher fatty acids are treated with low-molecular alcohol with addition of sulphuric acid as catalyst; alcohol is distilled off, diterpene acids and catalyst are neutralized by an inorganic base; esters of higher fatty acids are extracted by a hydrocarbon solvent; water-alkaline solution is acidified, and isolated diterpene acids are extracted by a hydrocarbon solvent; solvent is distilled off until the concentration of diterpene acids is 30-50%, and rodent repellent is obtained.

Neutral compounds are extracted by acetone and then by alcohol $C_1$-$C_3$. The mass ratio 1:2-1:5 neutral compounds: solvent is obtained by acetone treatment of concentrates of esters of higher fatty acids, triterpene alcohols, sterins and higher fatty alcohols, and acetone soluble remainder. The remainder is then retreated with alcohol, the total diterpene alcohols fraction is separated from the non-alcohol soluble compounds, which are then saponified by alcohol alkali solution to obtain polyprenols concentrate, which is then chromatographed on silica gel with substance:sorbent ratio of 1:10, using hexane, and hexane with addition of 5% of diethyl ester by volume, and hexane with addition of 10% diethyl ester by volume with sorbent:solvent ratio of 1:1, to isolate polyprenols.

EXAMPLES OF PREFERRED IMPLEMENTATION OF INVENTION

The method includes the following sequence of operations and procedures: Plant raw material—green conifer needles and foliage of deciduous species (birch, *ginkgo biloba*)—is extracted by organic solvent with subsequent treatment of the obtained extractive compounds by an aqueous solution of NaOH with obtaining of salts of higher fatty acids, resin and chlorophyllin acids (water-alkaline phase), as well as of neutral compounds, unsaponifiable under the conditions of the performed process (compounds soluble in organic solvent).

The solution of salts of resin, higher fatty and chlorophyllin acids is treated using an aqueous solution of mineral or organic ($C_1$-$C_3$) acid with solution density of 1,100-1,200 $kg^3$, with addition of water-immiscible organic solvent, heating of the mixture to 55-65° C. while mixing phases. The solution is kept at the given temperature for at least 3 hours without mixing.

The layer of organic solvent with higher and resin acids is drained or siphoned off; the organic solvent is added again and heated with mixing; settled for at least 3 hours; the organic solvent with remainder of higher and resin acids is siphoned or drained off once again. After separation of the layer containing organic solvent with dissolved acids, the aqueous solution with dissolved sodium salt is poured off.

Remaining chlorophyllin acids, insoluble in water and organic solvent are treated by live steam for removal of solvent traces and rinsing off sodium salts. Then, the liquid chlorophyllin melt is poured off into a container. The solvent is distilled from the solution of resin and higher fatty acids in organic solvent; the remainder is dissolved in low-molecular alcohol ($C_1$-$C_2$), heated up to at least 45° C., a catalyst is added and the mixture stirred.

After esterification, the acidic catalyst is neutralized NaOH or another base, the solvent is distilled, and water and hydrocarbon solvent are added diterpene, tricyclic and labdanic acids which are not esterified under these conditions, and esters of higher fatty acids transfer into the organic solvent. Then, alkali aqueous solution is added while stirring at 50-65° C. and left to settle.

Labdanic and tricyclic acids transfer into the water-alkaline phase as salts, while esters of higher fatty acids remain in the organic solvent. The organic solvent with esters of higher fatty acids is separated from the water-alkaline solution of diterpene acids. Solvent is distilled from the solution of acids' esters and esters of higher fatty acids (analogues of fats) are obtained. The water-alkaline solution is acidified to pH 1-3 using aqueous acid solution and isolated diterpene acids are extracted with hydrocarbon solvent; aqueous solution is separated from organic solvent phase; solvent is distilled obtaining the total diterpene acids fraction (used as a fruit tree rodent repellent) which is more effective than known repellents against rodents, insects wintering in fruit tree bark, and pathogenic microorganisms.

The solvent is distilled from the neutral compounds after separation of acids; the remainder is treated with acetone at 40-50° C. with stirring, then cooled to 0° C.+10° C. for at least 3 hours to settle the remainder. The ratio of substance:acetone is 1:4-1:8. At a ratio of less than 1:4, the produced volumetric remainder fills the total volume of the extracting agent, which makes its further separation by filtration difficult. Ratios of substance:acetone higher than 1:8 do not allow for separating the fraction containing esters of higher fatty acids and sterins, potentially due to the increase in the volume of the extracting agent vs these compounds, while also requiring larger vessels more energy spent on removing the solvent traces.

Formed sediment consisting of hydrocarbons, esters of higher fatty acids and fatty acids with higher fatty alcohols and triterpenoids, and fatty alcohols, is separated from compounds soluble in acetone. The remainder is washed with acetone cooled to −5° C.-10° C. and the solvent is combined with the main acetone solution. Then, acetone is distilled off and the remainder is treated with low-molecular alcohol ($C_1$-$C_3$). The substance:alcohol ratio is 1:2-1:5. With ethanol, alcohol-concentration is 86-90% by volume. Reducing the substance-alcohol ratio below 1:4 increases the number of extraction stages for diterpene alcohols due to their low solubility in alcohol; while increasing the ratio leads to increases in required vessel volume and energy consumption for subsequent distillation of the alcohol. The temperature during alcohol treatment is at least 40-50° C., at which most of diterpene alcohols transfer into alcohol and approximately half of polyprenols and their acetates are dissolved. With the mixture cooled below 30° C., polyprenols and their acetates precipitate from the solution and form an oily, slow moving sediment.

After cooling and sedimentation over 1-2 hours, the alcohol:solution is separated and the procedure is repeated. The completion of diterpene alcohols extraction is determined by TLC method in a solvent system of petroleum ether with addition of 8-12% of diethyl ester. The absence of a spot corresponding to labdanic alcohols on the chromatogram during its development by concentrated or 50% aqueous solution of sulphuric acid and subsequent heating of the chromatogram at 100-120° C. is an indicator of complete extraction of labdanic alcohols—the base for an antiseptic agent (fungicidal, bactericidal and antiviral activity). After extraction of labdanic alcohols, alcohol at the substance:solvent ratio of 1:2-1:3 and alkali (50-55 g/1 kg dry material) are added; heated up to 50-60° C.; and stirred at this temperature for 30 minutes.

The solvent is distilled off, the remainder of unsaponifiable compounds and salts of higher fatty acids is mixed with a solvent non-miscible in water (petroleum ether, hexane or diethyl ester); then the organic layer is washed twice with water. Walter extracts are separated and combined. The solvent non-miscible with water is added, heated, stirred and mixed with the aqueous solution of mineral acid to pH 2-3. Obtained acids transfer into organic phase, while the aqueous solution with obtained sodium and potassium salts of mineral acid are separated from the organic phase. The organic solvent is distilled off from the solution of unsaponifiable compounds and polyprenols concentrate with the total content of the main substance at least 80% is obtained. The obtained concentrate is chromatographed using a silica gel column. A solvent system of hydrocarbon solvent with increasing additions of a more polar solvent (hydrocarbon solvent with addition of 8-10% diethyl ester) is used as an eluent. Below are examples for utilization of the invention.

Example 1

2,950.0 g of green spruce needles containing 90% green needles (50.0% moisture content) are extracted in the Soxhlet device by petroleum ether with boiling limits of 70-100° C. for 6 hours. 118 g (8.0% of dry raw material weight) of extractive compounds are obtained. The extract is cooled and settled for 6 hours at 10-12° C. Extracted waxes are separated from the solution using filtration. 3.2 g of waxes with m.p. of 70-76° C. (2.7% of extractive compounds weight) are obtained.

The wax free solution of extractive compounds in petroleum ether is heated up to 60-65° C., with addition of 100 ml 30% aqueous solution of NaOH (pH=10), and stirred for 1 hour at 65-70° C. Then, the water layer is separated from the organic solvent. The solvent is rinsed twice with 0.25 l of warm water (50-60° C.) and settled after each rinse for 1 hour. Aqueous solutions are poured off and combined with the main water-alkaline solution of salts of organic acids. After separation of waxes and acids, the solution of extractive compounds has pH of 7 and orange color. Petroleum ether is distilled off from the solution of neutral compounds and 66.8 g (56.6% of total content of extractive compounds) of neutral compounds are obtained.

Water-alkaline solution of salts of organic acids is combined with the rinse water, heated to 60-65° C. with addition of 200 ml petroleum ether (m.p. 70-100° C.) and 100 ml 15% aqueous solution of sulphuric acid. After 10 minutes of stirring, the pH of the aqueous solution is measured. pH of the solution is 1-2. If pH is more than 3, 10 ml of aqueous solution of sulphuric acid is added and stirring continues for another 10 minutes. Then, the stirrer is switched off and the mixture is settled for 0.5-1 hour.

After settling, 3 layers are formed. The lower layer is an aqueous solution of sodium sulphate, the top—solution of higher fatty and resin acids, and the middle layer—emulsion of chlorophyllin acids insoluble in water or pet ether.

The top layer of organic acids in petroleum ether is separated by siphoning, the bottom is poured off. Chlorophyllin acids, insoluble in water or petroleum ether, are treated with direct steam and poured off into a container as a viscous oil, and dried at room temperature (20-25° C.), resulting in 7.4 g of chlorophyllin acids with 20% moisture content (5% of total content of extractive compounds).

The solvent is distilled off from the solution of organic acids in petroleum ether (higher fatty and resin acids) and in total 40.7 g of acids is obtained (34.5% of total content of extractive compounds). The obtained acids are dissolved in 250 ml of ethanol in a container with a reverse heat-exchanger, then heated until ethanol starts to boil and 0.5 ml of concentrated sulphuric acid is added. The heat-exchanger is switched to the direct mode and ethanol is distilled off. To the remainder 200 ml of petroleum ether (boiling range –70-100° C.) is added, the solution is washed with 50 ml of water while stirring, then the water is poured off.

Then, the solution is heated to 60-65° C. and 15 ml of 30% aqueous solution of NaOH is added. The solution is stirred for 30 minutes, and 15 ml of water is added, stirred for 10 minutes and settled for 1 hour. The water-alkaline solution is poured off. Solution of ethyl esters of higher fatty acids is rinsed with water (15 ml) while stirring and settled for 30 minutes; aqueous solution is poured off and added to water-alkaline solution of salts of tri- and bi-cyclic diterpene acids. The solvent is distilled off from the solution of ethyl esters of higher fatty acids in petroleum ether and 13.3 g of remainder is obtained (11.2% of total content of extractive compounds).

The water-alkaline solution of salts of diterpene acids is acidified to pH=1-2 by 30% aqueous solution of sulphuric acid and isolated organic acids are extracted with 100 ml of petroleum ether (boiling range 70-100° C.) while stirring at 60-65° C. The bottom layer containing sodium sulphate is poured off and the solvent is distilled off until the total content of diterpene acids in petroleum ether reaches 38-40%. Solution of diterpene acids in petroleum ether has rodent repellent properties (mice, jackrabbits), as well as bactericidal and fungicidal properties against pathogenic micro-organisms. Yield of repellent is 70.0 g, with dry substances weight of 27.0 g.

250 ml of acetone is added to 66.6 g of neutral compounds; heated to 40° C., stirred until a homogeneous suspension forms, and cooled to t<–5° C. for 4 hours. The acetone solution is separated by filtration into 2 parts: crystalline (solid) phase and the mother liquor. The crystalline phase (sedimented on the filter) is rinsed with 100 ml of acetone cooled to t=5° C. The acetone remaining on the solid phase is suctioned off at lowered pressure. Then, the remainder is transferred into a container and dried at lowered pressure and t=50-60° C. Yield of the solid phase is 18.5 g or 15.7% of total extractive compounds. After filtration, the rinse acetone is combined with the main acetone solution; acetone is distilled off and an oily mass (48 g or 40.7% of total extractive compounds) is obtained.

After acetone distillation, the remainder is combined with ethanol (250 ml, water content in solution is 12% by volume), the mixture is heated while stirring with a backflow condenser to 50° C. Then the mixture is cooled to 20-25° C. and settled for 3 hours. The ethanol solution with predominant content of dissolved diterpene alcohols is separated. The remainder is again combined with 250 ml of 88% ethanol, heated to 50° C., and then, the procedure for separation of alcohol solution of diterpene alcohols described above is used.

Separation of diterpene alcohols from the oily remainder by 88% ethanol is performed 4 times. After the 4$^{th}$ treatment with 88% ethanol, the remainder is analyzed for content of diterpene compounds using TLC. A spot with the remainder sample is applied onto a Silufol or Sorbitol plate; the plate is eluated by hexane with addition of 10% diethyl ester. The chromatogram is treated with concentrated sulphuric acid and heated at 120° C. Appearance of lilac spot with Rf=0.48 indicates the presence of diterpene labdanic alcohols in the mixture. The absence of the lilac spot with Rf=0.48 on chromatogram indicates the absence of labdanic alcohols in the remainder. If the labdanoid spot is present, fifth extraction of diterpene alcohols from the remainder is performed as described above. Then, alcohol extracts are combined, alcohol is distilled off, and 31.2 g of diterpene alcohols concentrate is obtained (26.4% of the total extractive compounds).

The diterpene alcohols concentrate contains approximately 5% mono- and sesquiterpenes. They are separated from the diterpene alcohols by treating the concentrate with direct steam. Essential oils with water vapors are directed into a heat exchanger; condensed liquid is pooled into a collector. In the collector, the water layer is separated from the essential oil-product, with obtaining 1.7 g of essential oils. The remainder after distilling off the essential oil, containing diterpene alcohols, is dried by indirect steam and collected. Yield of diterpene alcohols fraction is 29.5 g or 24.6% of the total extractive compounds.

The remainder after extraction by 88% ethanol was 17.1 g, when calculated as dry weight. To the remainder containing esters and free polyprenols, are added 50 ml of ethanol and 1.1 g of dry NaOH. The solution is heated and alcohol is gradually distilled off. The obtained remainder is combined while stirring with 70 ml of hexane, heated to 50° C., and 10 ml of water is added. After all the water is added, the stirrer is disconnected and the mixture is settled for 1 hour. Water-alkaline layer is separated from the unsaponifiable compounds in hexane. The solvent is distilled off and 14.7 g of remainder is obtained. The water-alkaline solution is added to a part of the water-alkaline solution of free acids from the next batch of extracted conifer needles, before its acidification by 15% sulphuric acid or it is treated separately. In the latter case, the water-alkaline solution of salts of higher fatty acids is combined with hexane and heated to 50° C. while stirring; then, a 15% aqueous solution of sulphuric acid is added to pH=2. The solution is stirred for 15 min and settled for 1 hour. Aqueous solution of sodium sulfate is poured off, hexane is distilled off, and 1.9 g of higher fatty acids is obtained.

Unsaponifiable compounds (14.7 g) are transferred into a column with 150 g silica gel (column length 0.80 m, diameter 0.03 m) and consecutively extracted by 300 ml of hexane, 300 ml of hexane containing 5% (by volume) of diethyl ester, and at the end, 500 ml of hexane with 10% diethyl ester. The last fraction contains polyprenols. Separation of the fraction is controlled by TLC. The solvent system is hexane containing 10% diethyl ester. Concentrated sulphuric acid is used to develop the chromatogram. The polyprenols spot is red-brown in color with Rf=0.50-0.52. Solvent is distilled off from the fraction containing polyprenols. 11.8 g of polyprenols or 10% of the total extractive compounds is obtained.

Separation of extractive compounds contained in spruce conifer needles, results in obtaining the following compounds (% of weight total extractive compounds):

| | |
|---|---|
| Chlorophyllin acids | −5.0 |
| Ethyl esters of higher fatty acids | −11.2 |
| Total resin acids | −24.6 |
| Wax, m.p. 70-76° C. | −2.7 |
| Concentrate of diterpene alcohols | −22.9 |
| Essential oil | −1.4 |
| Complex Esters | −15.7 |

Including:

| | |
|---|---|
| Esters of higher fatty acids and triterpenoids | −9.0 |
| Esters of higher fatty acids and higher fatty alcohols | −4.7 |
| Polyprenols | −10.0 |
| Higher fatty acids | −1.6. |

Example 2

3,580 g of green pine needles containing 85% needles, moisture content of 50.5% are extracted in a reflux-condenser type extractor with hexane for 4 hours. 249.9 g of extractive compounds, or 14.1% of dry raw material weight, is obtained.

The extractive compounds dissolved in hexane are separated, as shown in Example 1, into the following products (percent of weight of total extractive compounds):

| | | |
|---|---|---|
| Coniferous wax | 9.2 g | 3.7% |
| Chlorophyllin acids | 32 g | 1.3% |
| Ethyl esters of higher fatty acids | 33.7 g | 13.5% |
| Total resin acids | 75.5 g | 30.2% |
| Neutral compounds | 127.5 g | 51.0% |

Neutral compounds 127.5 g 51.0% Neutral compounds are treated with 500 ml acetone at 50° C. for 30 minutes, and stirred with a reverse heat exchanger. The stirrer is disconnected and its content cooled to 0° C. and settled at this temperature for 1 hour. Top liquid layer was siphoned off; the remainder combined with 250 ml of acetone cooled to 0° C., then stirred for 10 minutes, the mixer was disconnected, and the mixture was settled at 0° C. for 30 minutes. Top liquid layer was separated from the sediment by siphoning and combined with the main acetone solution. The sediment was transferred to a vacuum-filter, the acetone remainder was suctioned off and combined with the main solution. Acetone (430 ml) was distilled off from the combined acetone solution; the remainder of the acetone solution (300 ml) was cooled to −10° C. The cooled solution was settled at −10° C. for an hour; then poured off into a vacuum filter and separated from the sediment. Sediments were combined and dried from acetone traces. The yield of the complex esters fraction is 48.7 g.

The solvent was distilled off from acetone soluble compounds; the yield of oily remainder was 77.9 g. Then, the remainder was treated as described in Example 1. The following products were obtained after separation of neutral compounds:

| | | |
|---|---|---|
| Complex esters of higher fatty acids, triterpene and aliphatic alcohols Of neutral compounds | −48.7 g | 38.2% |
| Concentrate of diterpene | −37.4 g | 29.3% |
| Essential oil | −3.2 g | 2.5% |
| Polyprenols | −11.7 g | 9.2% |
| Higher fatty acids | −7.8 g | 6.1%. |

Example 3

3,900 g of mulched small *Cunningamia lanzeolata* branches (85% needles content and moisture content of 52%) were extracted in a Soxhlet extractor for 5 hours, with petroleum ether, boiling range 70-100° C. 134.8 g of extractive compounds, or 7.2% of dry raw material weight, were obtained. After cooling and settling of the solution of extractive compounds in petroleum ether at 10° C. for 12 hours, 1.6 g of wax was obtained (12% of the total extractive compounds). The following products were obtained as a result of treatment of extractive compounds after separation of waxes, as described in Example 1:

| | | |
|---|---|---|
| Chlorophyllin acids | –3.0 g | 2.2% |
| Of total of extractive compounds | | |
| Total higher fatty and resin acids | –13.5 g | 10.8% |
| Of total of extractive compounds | | |
| Neutral compounds | –116 g | |

The total acids were separated into esters of higher fatty acids—3.0 g, 2.2%, which contained the following compounds as main components: myristic acid ester—15% of total esters of higher fatty acids; palmitic acid ester—19%; oleic acid ester—19%; linoleic acid ester—18%; and linolenic acid ester—8%, as well as diterpene resin acids—10.1 g or 7.5%. Diterpene acids consist of one component—4-epi-trans-communic acid.

Neutral compounds were treated with 550 ml acetone while stirring at 45-50° C. for 30 minutes with a backflow condenser. The mixer was switched off the mixture cooled to 0° C. and settled at this temperature for 5 hours. Acetone was siphoned off; sediment transferred onto a filter and rinsed with 200 ml of acetone cooled to 0° C. Acetone extracts were combined. Acetone was distilled off, the acetone soluble compounds yielded 68.4 g, or 59.0% of neutral compounds. The total complex esters of higher fatty acids of triterpenoids and aliphatic alcohols nonsoluble in acetone yielded 46.7 g, 41%.

After distillation of acetone, acetone soluble compounds were treated with 350 ml of 86% ethanol, as described in Example 1, obtaining 20.2 g of diterpene compounds transferable into ethanol and consisting of: 75% 4-epi trans-communol; 4-epi trans-communol (6%) and methyl ester of 4-epi-trans-communic acid (4%), with traces of triterpene alcohols and β-sitosterol.

Oily sediment, insoluble in 86% ethanol at 20-30° C., was saponified in 150 ml of ethanol containing 3.0 g of NaOH in a rotary evaporator with simultaneous distillation off of the solvent. After treatment of the remainder after ethanol distillation, as described in Example 1, 2.5 g of higher fatty acids and 42.5 g of unsaponifiable compounds were obtained. Unsaponifiable compounds were chromatographed using a column with 400 g of silica gel; and eluated with hexane containing 10% diethyl ester, obtaining 33.7 g of polyprenols.

As a result of separation of extractive compounds the following products were obtained:

| | | |
|---|---|---|
| Coniferous wax | 1.6 g | 1.2% |
| Chlorophyllin acids | 3.0 g | 2.2% |
| Ethyl esters of higher fatty acids | 3.0 g | 2.2% |
| 4-epi-trans-communic acid (resin acid) | 10.1 g | 7.5% |
| Esters of higher fatty acids of triterpene and aliphatic alcohols (phytosterols) | 47.6 g | |
| Concentrate of diterpene alcohols | 20.2 g | |
| Higher fatty acids | 2.5 g | |
| Polyprenols | 33.7 g | |

Example 4

2,580 g of *Ginkgo Biloba* leaves with moisture content of 52% were mulched and extracted in a reflux-condenser type extractor by hexane with a 1:1 leaves:solvent ratio for 5 hours. 58.2 g of extractive compounds were obtained (4.7% of dry foliage weight). After pouring off the extractive compounds in hexane from the extractor, the solution was cooled to +4.0° C.; the formed wax sediments were filtered out from the solvent, obtaining 0.9 g of waxes (15% of extractive compounds).

After separation of waxes, the extractive compounds in hexane were treated with 30% aqueous solution of NaOH; then aqueous solution of acids of salts was separated from the solution of neutral compounds in hexane, as shown in Example 1. Solvent was distilled off from the solution of neutral compounds, obtaining 42.3 g of neutral compounds (72.7% of extractive compounds).

Aqueous solution of salts of acids was treated with 10% aqueous solution of sulphuric acid, as shown in Example 1, obtaining the following products:

| | | |
|---|---|---|
| Higher fatty acids | –12.8 g | 22.0% of extractive compounds |
| Chlorophyllin acids | –2.1 g | 3.5% of extractive compounds |

After treatment of neutral compounds with acetone, as shown in Example 1, 8.2 g (19.4% of neutral compounds) of complex esters of higher fatty acids of triterpene and aliphatic alcohols, nonsoluble in acetone was obtained; 34.1 g of neutral compounds transferred into acetone.

After the acetone is distilled off, acetone soluble neutral compounds were treated with 86% ethanol solution, as shown in Example 1, obtaining 4.6 g (10.9% of neutral compounds) of compounds primarily consisting of phytosterins (main component β-sitosterol) and triterpene alcohols soluble in ethanol, as well as 29.5 g of compounds nonsoluble in ethanol under conditions outlined in Example 1. Compounds nonsoluble in 86% ethanol at 20-30° C. were treated with 100 ml of ethanol containing 1.5 g of NaOH on a rotary evaporator, as described in Example 3, obtaining 0.5 g of acids (1.2% of neutral compounds) and 27.5 g of oily liquid consisting of 94.5% of polyprenols. Purification by column chromatography with silica gel allowed for obtaining of 26.0 g of polyprenols (61.5% of neutral compounds weight).

Example 5

2,400 g of birch tree trunk sawdust with moisture content of 27% were extracted using petroleum ether (boiling range: 80-120° C. in a Soxhlet extractor). Solvent was partially distilled off until the ratio of dry compounds in extract was 1:1 (26.3 g of extractive compounds in 270 ml of solvent) and settled at 0° C. for 12 hours. Formed sediment of waxy compounds, 1.1 g (4.2% of the total extractive compounds) was separated by filtration.

While stirring at 65-70° C., the filtrate was combined with 20 ml of 30% aqueous solution of NaOH, stirred for 30 minutes, then 50 ml of water was added while stirring and left to settle for 4 hours. The bottom layer containing an aqueous solution of salts of acids was poured off and another 50 ml of water added while stirring. The solution was mixed for 30 minutes, then settled for 4 hours at 60-65° C., then the water layer was poured off and added to the main solution of salts of acids. Petroleum ether was distilled off from solution of extractive compounds, obtaining 8.3 g (31.5% of the total extractive compounds) of neutral components.

Aqueous solution of salts of acids (120 ml) was treated with a 15% aqueous solution of sulphuric acid to pH=2; 50 ml of petroleum ether was added; the solution mixed at 50-52° C. for 10 minutes. Then, the solution was settled for 30 minutes and the top petroleum ether layer was separated from the water phase by siphoning. Thirty ml of petroleum ether was added to the water phase, the solution was mixed for 10 minutes and settled for 30 minutes; the lower water layer was poured off. The petroleum ether solution containing higher fatty acids was combined with the main solution. Petroleum ether was distilled off and 16.5 g of higher fatty acids (63.1% of the total extractive compounds) was obtained.

The fraction of higher fatty acids was combined with 100 ml ethanol, heated with stirring until boiling, and 4 drops of concentrated sulphuric acid was added. Ethanol was distilled off, the remainder combined with 100 ml of petroleum ether, the solution rinsed twice with stirring with 30 ml water, petroleum ether was distilled off, with obtaining 18.0 g of ethyl esters of higher fatty acids.

Neutral fraction—8.3 g—was treated with 50 ml acetone, cooled to 0° C., and settled at this temperature for 4 hours. Formed sediments were filtered out and treated as in Example 1. Filtrate was cooled once again to −10° C., and the procedure for separation of sediments was repeated. Sediments were combined and totalled 4.0 g (15.2% of extractive compounds weight).

Sediment consisted of complex esters, the acid fraction of which contained higher fatty acids (80% palmitinic, linolenic and oleinic acids), while the alcohol fraction contained aliphatic alcohols of normal composition —$C_{12}$-$C_{26}$, triterpene alcohols and sterols.

After distillation off of acetone, the compounds soluble in acetone (2 g) were treated with methanol (25 ml) by heating and mixing in a backflow condenser up to methanol boiling point (50-53° C.). Then, the mixture was cooled to 20-22° C. The compounds soluble in methanol were separated from the oily remainder by siphoning. The process was repeated 2 more times. The completion of the methanol extraction was controlled via TLC according to a decrease of concentration of the aliphatic alcohols spot, which have Rf values similar to those of polyprenols (typical for extractive compounds of birch). TLC plate was developed in iodine vapors. The yield of the oily remainder containing polyprenols was 3.0 g (11.4% of the total extractive compounds), whereas for compounds soluble in methanol, it was 1.2 g (4.6% of the total extractive compounds).

The oily remainder (3.0 g) was combined with 25 ml of ethanol and 0.2 g of NaOH. The solution was heated to boiling point and ethanol was distilled off. The remainder was combined with 30 ml of water and 30 ml of petroleum ether, mixed at 50-55° C. for 10 minutes, the mixture settled for 30 minutes, the upper layer containing unsaponifiable compounds was separated by siphoning. Aqueous solution of salts of acids was combined with 1.5 ml of 15% of aqueous solution of sulphuric acid and 30 ml of petroleum ether. The obtained mixture was stirred, settled, and the extracted higher fatty acids in organic solvent were separated by siphoning. The solvent was distilled off, obtaining 0.2 g of higher fatty acids (0.7% of extractive compounds) and 2.7 g of unsaponifiable compounds (10.3% of extractive compounds).

Unsaponifiable compounds were separated using column chromatography and polyprenols were isolated 2.5 g (9.5% of extractive compounds).

Processing of extractive compounds of birch trunk (sawdust) resulted in obtaining the following products (in % of total of extractive compounds, extracted by hydrocarbon solvent):

| | |
|---|---|
| Waxes, m.p. 70-76° C. | −4.2 |
| Ethyl esters of higher fatty acids | −68.4 |
| Complex esters of higher fatty acids, triterpene alcohols and sterins | −15.2 |
| Triterpene and higher fatty alcohols, sterins | −4.6 |
| Higher fatty acids | −0.7 |
| Polyprenols | −9.5 |

Example 6

1,550 g of fir green needles (converted to dry weight) was extracted by hexane for 8 hours in a Soxhlet extractor, treated the same way as in Example 1, and 13.8 g of extractive compounds (8.9% of dry conifer needles weight) was obtained. The extractive compounds were treated the same way as in Example 1 and the following products were obtained:

| | | |
|---|---|---|
| Coniferous Wax | −6.3 g | 4.6% |
| Ethyl esters of higher fatty acids | −48.7 g | 35.3% |
| Total resin acids | −12.6 g | 9.1% |
| Chlorophyllin acids | −6.3 g | 4.6% |
| Neutral compounds | −68.9 g | 49.9% |
| of the total of extractive compounds | | |

Total of free higher fatty and resin acids was 56.5 g or 40.9% of the total of extractive compounds.

Neutral compounds are processed as in Example 1 and the following products are obtained:

| | | |
|---|---|---|
| Essential oil | −3.3 g | 4.3% |
| Concentrate of diterpene alcohols | −27.4 g | 39.8% |
| Complex esters of triterpene, higher fatty alcohols, sterins with higher fatty acids | −23.2 g | 33.6% |
| Higher fatty acids | −5.2 g | 7.6% |
| Polyprenols | −9.8 g | 14.2% |
| Of total of extractive compounds | | |

Industrial Utility

The offered invention is an effective method of processing extractive compounds from plant foliage, which increases yield of the main products: labdanoid concentrate, higher fatty acids, polyprenols concentrate, as well as increased content of chlorophyllin acids and rodent repellent.

Formula of the Invention

The formula of the invention pertains to the method of processing plant raw materials consisting of green foliage of coniferous and decideous trees and is based on extraction of plant raw materials with an organic solvent; subsequent separation of waxes using settling with cooling and filtration; separation of free acids from the obtained solution of extractive compounds in hydrocarbon solvent by an alkaline solution; separation of the obtained neutralised solution into a solution of neutral compounds in hydrocarbon solvent and water-alkaline solution of salts of organic acids; acidification of the water-alkaline solution of salts by a non-organic or organic acid; separation of chlorophyllin acids and fraction of fatty and resin acids by settling; subsequent separation of the total diterpene and higher fatty acids; distillation off of the solvent from neutral compounds and separation of neutral compounds.

The method differs from existing ones in that the total of diterpene and higher fatty acids is treated with a low-molecular alcohol with addition of sulphuric acid as catalyst; alcohol is distilled off and diterpene acids and the catalyst are neutralised by a non-organic base; esters of higher fatty acids are extracted by hydrocarbon solvent; water-alkaline solution is acidified and separated diterpene acids are extracted by a hydrocarbon solvent; the solvent is distilled off until diterpene acids concentration is 30-50%, with obtaining of rodent repellent.

Neutral compounds are subsequently extracted by acetone and alcohol $C_1$-$C_3$, with the mass ratio of neutral compounds-extracting agent 1:2 to 1:5; then, after treatment with acetone concentrates of complex esters of higher fatty acids with triterpene alcohols, sterols, and higher fatty alcohols and the remainder soluble in acetone are obtained. During treatment of the remainder with alcohol, the total of diterpene alcohols are separated from compounds insoluble in alcohol, which are saponified with an alcohol solution of alkali to obtain polyprenols concentrate, which is chromatographed on silica gel at a substance-sorbent ratio of 1:10 and hexane, and hexane with 5% diethyl ester by volume, and hexane with 10% diethyl ester by volume at sorbent-solvent ratio of 1:1 to obtain polyprenols.

What is claimed is:

1. A method for processing plant raw materials from foliage of coniferous and deciduous tree species, said method comprising the steps of:
    extracting source material by organic solvent;
    subsequent isolation by settling, cooling and filtrating of waxes to obtain a solution of extractive compounds;
    separating free acids from the obtained solution of extractive compounds in hydrocarbon solvent using an alkali solution to obtain a neutralized solution;
    fractionating of the obtained neutralized solution into a solution of neutral compounds in hydrocarbon solvent and an aqueous-alkaline solution of salts of organic acids comprising higher fatty acids, resin acids and chlorophyllin acids;
    acidifying the aqueous-alkaline solution of salts by inorganic or organic acid;
    subsequent separation by settling of chlorophyllin acids and a fraction of higher fatty acids and resin acids comprising diterpene acids;
    selective esterifying the higher fatty acids present in the fraction of higher fatty acids and resin acids comprising diterpene acids, by treating the fraction of higher fatty acids and resin acids comprising diterpene acids with a low molecular weight alcohol with addition of sulphuric acid as a catalyst, wherein the higher fatty acids are esterified into esterified higher fatty acids and the diterpene acids are not esterified; and
    subsequent fractionating of the non-esterified diterpene acids from esters of the esterified higher fatty acids.

2. A method as claimed in claim 1, further comprising the steps of:
    distilling alcohol off; and
    neutralizing the diterpene acids and the catalyst with an inorganic base.

3. A method as claimed in claim 1, further comprising the steps of:
    distilling hydrocarbon solvent from the neutral compounds; and
    isolating the neutral compounds.

4. A method as claimed in claim 3, further comprising the step of treating said neutral compounds with acetone to obtain concentrates of esters of higher fatty acids with triterpene alcohols, sterins and higher fatty alcohols, and a remainder of said concentrates soluble in acetone.

5. A method as claimed in claim 2, further comprising the steps of:
    extracting the esterified higher fatty acids by hydrocarbon extractive agent;
    acidifying the aqueous-alkaline solution; and
    extracting the fractionated non-esterified diterpene acids by hydrocarbon solvent.

6. A method as claimed in claim 5, further comprising the step of distilling the hydrocarbon solvent until achieving 30-50% concentration of diterpene acids to obtain a repellent against rodents.

7. A method as claimed in claim 4, further comprising the steps of treating the remainder with alcohol, isolating diterpene alcohols from compounds insoluble in alcohol, saponifying the compounds insoluble in alcohol with an alkali alcohol solution to obtain a polyprenol concentrate, and performing chromatography of the polyprenol concentrate on silica gel to obtain polyprenols.

8. A method as claimed in claim 4, further comprising the step of sequential extracting the neutral compounds extracted by acetone and alcohol.

9. A method as claimed in claim 8, wherein the alcohol is $C_1$-$C_3$ alcohol and wherein the mass ratio of neutral compounds/extracting agent is 1:2 to 1:5.

10. A method as claimed in claim 7, wherein the polyprenols concentrate is chromatographed on silica gel with a substance-sorbent ratio of 1:10, using hexane and hexane with addition of 5% volumetric diethyl ether, and hexane with addition of 10% volumetric diethyl ether at a sorbent-solvent ratio of 1:1, to isolate polyprenols.

11. A method as claimed in claim 2, further comprising the steps of:
    distilling hydrocarbon solvent from the neutral compounds; and
    isolation of the neutral compounds.

12. A method as claimed in claim 5, further comprising the steps of:
    distilling hydrocarbon solvent from the neutral compounds; and
    isolation of the neutral compounds.

13. A method as claimed in claim 6, further comprising the steps of:
    distilling of hydrocarbon solvent from the neutral compounds; and
    isolation of the neutral compounds.

* * * * *